United States Patent
Wainer et al.

(10) Patent No.: US 11,463,887 B2
(45) Date of Patent: Oct. 4, 2022

(54) SYSTEMS AND METHODS FOR NETWORK COVERAGE OPTIMIZATION AND PLANNING

(71) Applicant: Verizon Patent and Licensing Inc., Basking Ridge, NJ (US)

(72) Inventors: Joshua H. Wainer, Martinsville, NJ (US); Paul Kerl, East Arlington, MA (US); Michael Antony Raj, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/370,413

(22) Filed: Jul. 8, 2021

(65) Prior Publication Data

US 2021/0337393 A1    Oct. 28, 2021

Related U.S. Application Data

(63) Continuation of application No. 16/530,008, filed on Aug. 2, 2019, now Pat. No. 11,089,485.

(51) Int. Cl.
*H04W 16/18*    (2009.01)
*G06N 20/00*    (2019.01)
*H04W 16/16*    (2009.01)

(52) U.S. Cl.
CPC ............ *H04W 16/16* (2013.01); *G06N 20/00* (2019.01)

(58) Field of Classification Search
CPC ...... H04W 24/02; H04W 16/18; H04W 24/08; H04W 84/042; H04W 16/32; H04W 24/00; H04W 24/10; H04W 16/10; H04W 72/082; H04W 16/14; H04W 72/00; H04W 16/22; H04W 16/02; H04W 72/1257; G06N 20/00
See application file for complete search history.

(56) References Cited

U.S. PATENT DOCUMENTS

| 7,099,670 B2 * | 8/2006 | Alicherry ............. H04W 4/02 455/446 |
| 10,425,832 B1 * | 9/2019 | Zawadzki ......... H04L 41/5038 |
| 10,542,330 B2 * | 1/2020 | Hopcraft ............ H04L 41/145 |

(Continued)

OTHER PUBLICATIONS

Mirza et al., "Big Data Analytics, Machine Learning, and Artificial Intelligence in Next-Generation Wireless Networks" (Year: 2018).*

(Continued)

*Primary Examiner* — Dung Hong

(57) ABSTRACT

A system identifies first areas of a plurality of areas of a wireless network for wireless site installation. The system performs machine learning to associate measured network performance parameters within the wireless network with empirical data related to at least one of population, residential buildings, or business buildings within the identified first areas of the wireless network. The system optimizes, based on the machine learning, geographic placement of prospective wireless sites within each of the identified first areas of the wireless network to maximize improvements in network performance parameters associated with installing the prospective wireless sites. The system provides optimized wireless site placement recommendations for wireless site installation in each of the identified first areas.

20 Claims, 13 Drawing Sheets

(56) References Cited

U.S. PATENT DOCUMENTS

| | | | | |
|---|---|---|---|---|
| 2003/0220774 | A1* | 11/2003 | Fattouch | H04W 16/18 |
| | | | | 703/2 |
| 2007/0066317 | A1* | 3/2007 | Amft | H04W 16/18 |
| | | | | 455/446 |
| 2013/0095846 | A1* | 4/2013 | Brisebois | H04W 24/10 |
| | | | | 455/456.1 |
| 2018/0206135 | A1* | 7/2018 | Chow | H04L 43/50 |
| 2020/0162336 | A1* | 5/2020 | Gonguet | H04L 41/0823 |
| 2020/0169895 | A1* | 5/2020 | Chen | H04B 17/3913 |

OTHER PUBLICATIONS

Campos et al., "Genetic algorithm-based cellular network optimisation considering positioning applications", Apr. 2019 (Year: 2019).*
Kibria, et al., "Big Data Analytics, Machine Learning, and Artificial Intelligence in Next-Generation Wireless Networks", "Big Data Analytics, Machine Learning, and Artificial Intelligence in Next-Generation Wireless Networks," in IEEE Access, vol. 6, pp. 32328-32338, 2018, doi: 10.1109/ACCESS.2018.2837692.

* cited by examiner

Prospective Cell site $i = 3$ $A_3 = \{1, 2, 4, 5\}$

Non-overlapping new cell site constraint $= x_3 + (x_1 + x_2 + x_4 + x_5) \leq 1$

SYSTEMS AND METHODS FOR NETWORK COVERAGE OPTIMIZATION AND PLANNING

CROSS-REFERENCE TO RELATED APPLICATIONS

The present application is a continuation of, and claims priority to, U.S. application Ser. No. 16/530,008 entitled "Systems and Methods for Network Coverage Optimization and Planning," filed Aug. 2, 2019, the content of which is incorporated by reference herein in its entirety.

BACKGROUND

Communication networks often span extensive geographic areas and involve many components spread out over that geographic area for providing network service to numerous customers at residential and business addresses. Over time, as localized demand upon the network increases due to increases in the local population (e.g., increased numbers of residential housing or increased numbers of businesses) or changes in population mobility patterns, the network may need to be expanded in certain areas to properly service the increased demand for network services. Such expansions in network infrastructure can be costly and can be difficult to plan and optimize given equipment constraints and often inadequate knowledge of future network needs.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

In wireless networks, such as Public Land Mobile Networks (PLMNs), field radio frequency (RF) engineers currently suggest cell sites for coverage based on local knowledge and roaming agreement data. In embodiments described herein, a network coverage optimization system is provided that implements an automated technique for optimizing the installation of new cell sites based on empirical data such as forecasts of population, business growth, and residential growth. The network coverage optimization system describe herein identifies particular regions (e.g., cellular market areas (CMAs) and/or cities) for new cell site installation based on, among other factors, forecasted population growth, existing "no coverage" areas, and residential and business construction growth within the particular regions relative to other regions. For example, the network coverage optimization system may identify particular CMAs and/or cities nationwide, that have higher forecasted population growth and higher residential and business construction growth than other CMAs and/or cities. The network coverage optimization system may further implement a machine learning engine to predict network performance parameters of prospective cell sites, within the identified regions, based on historical population, housing, business, and network performance data. The network coverage optimization system additionally implements a mixed linear programming optimization engine to optimize the placement of prospective cell sites within the identified regions to so as to optimize wireless coverage and maximize network performance parameter improvements while also satisfying network resource, and other, constraints. The network coverage optimization system provides cell site placement recommendations, such as number, type, and placement of wireless RF sites for the wireless network, based on the results of the mixed linear programming optimization.

Figure 1:
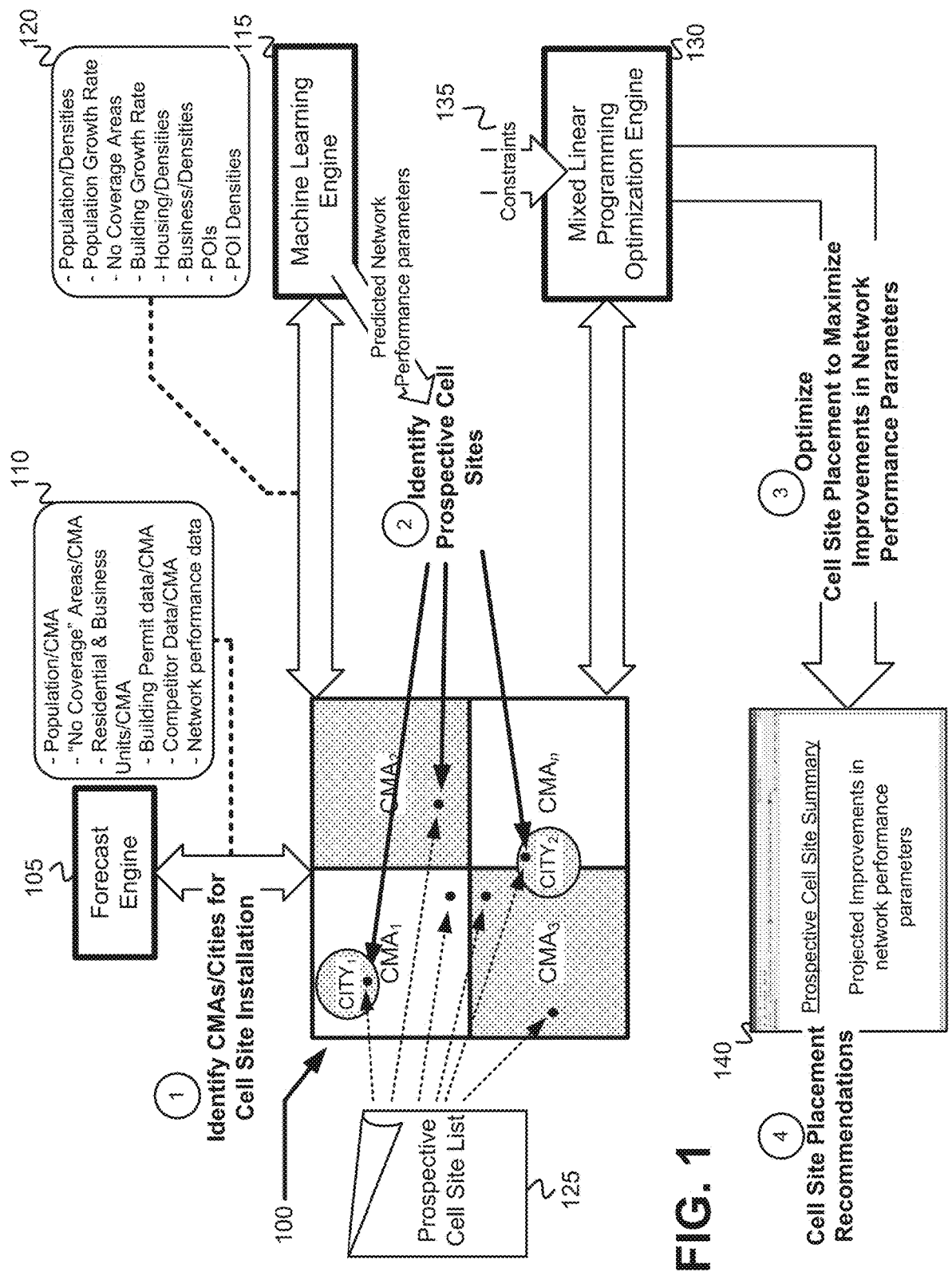
FIG. 1 is a diagram that depicts an overview of a network coverage optimization system within a wireless network.

FIG. 1 is a diagram that depicts an overview of a network coverage optimization system that may use machine learning and linear programming to optimize the number, type, and placement of wireless RF sites within a wireless network. In some implementations, the wireless network may include a PLMN. Each wireless network described herein may be operated by a particular wireless network service provider. A "wireless RF site," "wireless site," or "cell site," as described herein, refers to transceiver components, such as one or more antennas (e.g., an antenna array(s)), installed, or to be installed, at a particular geographic location within a wireless network to provide RF coverage for one or more particular areas at, or around, that location. In some implementations, the transceiver components at each cell site may only include the one or more antennas and, possibly, other components such as transmitter(s) and receiver(s), amplifier(s), etc. The transceiver components at each cell site may connect to other components located at a base station or an off-site location (e.g., to a base band controller). For example, in one implementation, each cell site may include one or more remote radio heads (RRHs) that may further be connected to an off-site base band unit (BBU).

As shown in FIG. 1, a region 100 to which a wireless network service provider provides wireless network services, via a wireless network operated by the wireless network service provider, may be divided into sub-regions. The sub-regions may include any type of geographic aggregation that may be used to divide a particular region 100 into smaller geographic areas. The sub-regions may include, for example, sub-markets of an overall market region, counties within a given State, geographic grids of a given spacing (e.g., 0.1 mile×0.1 mile grid), network markets that include groups of cities, counties, or CMAs, or groups of network markets. In one implementation, the sub-regions may include CMAs. $CMAs_1$ through $CMA_n$ are shown in FIG. 1 as a simplified example. Real-world examples of CMAs, or other types of sub-regions or geographic divisions, may have different shapes, and may be arranged in different patterns, than the simplified checkerboard pattern of CMAs depicted in FIG. 1. CMAs may be defined by an oversight agency and represent coverage areas for the issuance of spectrum licenses to wireless network service providers. CMAs may include, for example, Metropolitan Statistical Areas (MSAs) and Rural Service Areas (RSAs). In other circumstances, however, different methods of dividing region 100 into sub-regions, other than CMAs, may be used with the cell site optimization techniques described herein. Region 100 may additionally include one or more cities (e.g., $City_1$, $City_2$) that are located at various different locations within the CMAs of region 100.

A forecast engine 105 of the network coverage optimization system described herein may obtain various different types of data 110 related to the CMAs/cities of region 100 for performing forecasting. The data 110 may include, for example, population data for each CMA/city e.g., over time); residential and business units (e.g., over time), "no coverage" areas identifying areas in which the wireless network service provider's wireless network currently does not offer wireless network coverage within each CMA/city of region 100; data on residential and business building permits over time in each CMA/city; data on competitors' market shares by CMA/city (e.g., over time); and network performance data (e.g., number of dropped calls, frequency of low throughput connections, signal strength) within each CMA/city, Forecast engine 105 may forecast, based on the data 110, future population growth rates by. CMA/city, future residential and business building construction growth rates by CMA/city, future increases or decreases in network performance parameters by CMA/city, and CMAs/cities where competitors will likely, in the future, exceed the wireless network service provider's market share. Forecast engine 105 may identify (shown with a "1" within a circle in FIG. 1) CMAs and/or cities within region 100 for possible cell site installation based on the existing population and residential/business units per CMA/city and further based on the forecasted population growth rates, building construction growth rates, competitors' market share per CMA/city, and network performance parameters within each CMA/city.

A machine learning engine 115 of the network coverage optimization system may, in one implementation, obtain a prospective cell site list 125. The prospective cell site list 125 may detail specific proposed geographic locations, within CMAs/cities of region 100, for possible cell site installation, and, possibly, particularly types of RF transceiver equipment, to install at those geographic locations. The prospective cell site list 125 may, in one implementation, be pre-generated based on a survey of existing wireless network coverage provided by the provider's wireless network. The machine learning engine 115 may further obtain various different types of data 120 related to the CMAs/cities of region 100. The data may include, for example, population and population density data for each CMA/city, population growth rate data for each CMA/city, "no coverage" areas within each CMA/city of region 100, residential and business building construction growth rates for each CMA/city, housing and housing density data for each CMA/city, business and business density data for each CMA/city, points of interest (POIs) data for each CMA/city, network performance data for each CMA/city, and POI densities for each CMA/city. POIs may include particular locations that attract, or are associated with, higher levels of wireless network usage (e.g., stadiums, universities, airports, schools). Machine learning engine 115 may perform machine learning techniques, based on the prospective cell sites contained in list 110 and based on the obtained data 120 related to the identified CMAs/cities of region 100, to predict network performance parameters associated with the prospective cell sites within each identified CMA/city.

In one implementation, the machine learning techniques may include creating a. random forest regression model, or a random forest classification model, using training and validation data, to associate network performance parameters measured with respect to existing cell sites, with specific counts of types of POIs, POI densities, population counts, population densities, housing counts, and/or housing densities that are associated with those existing cell sites. Test data may then be input into the trained model to predict the network performance parameters associated with prospective cell sites installations. Other machine learning techniques, however, may be used for predicting the network performance parameters associated with prospective cell sites. Based on the predicted network performance parameters associated with the prospective cell sites, machine learning engine 115 may identify (shown with a "2" within a circle in FIG. 1) prospective cell sites, at particular geographic locations, that are associated with sufficiently high improvements in predicted network performance parameters. In one implementation, prospective cell sites having x % improvements (where x is a specified threshold percentage value) in predicted network performance parameters in a geographic location or region, compared to measured network performance parameters in that geographic location region with existing cell sites, may be identified for possible installation.

Using the identified prospective cell sites within the CMAs/cities identified for possible cell site installation, a mixed linear programming optimization engine 130 determines resource requirements for building/installing, each of the identified prospective cell sites and determines projected improvements in network performance parameters associated with building or installing each of the identified prospective cell sites. Engine 130 further implements mixed linear programming, using the determined resource requirements and projected network performance parameter improvements, and applies resource, and other, constraints 135 to optimize wireless sites within each identified CMA/city so as to maximize improvements in network performance (shown with a "3" within a circle in FIG. 1). The resource constraints may include constraints or limitations on the availability of money, the availability of cell site parts or equipment, or the availability of installation personnel. Engine 130, based on the optimization to maximize improvements in network performance parameters, may provide wireless site placement recommendations with a prospective cell site summary (shown with a "4" within a circle in FIG. 1). Engine 130 may provide the wireless site placement recommendations in a "push" or "pull" manner. In a "push" situation, engine 130 may electronically transmit the wireless site placement recommendations directly to particular devices upon completion of the mixed linear programming optimization (e.g., to devices carried by cell site installers). In a "pull" situation, engine 130 may electronically supply the wireless site placement recommendations upon request by user devices, such as via a web server when the user devices access the web server.

Figure 2:
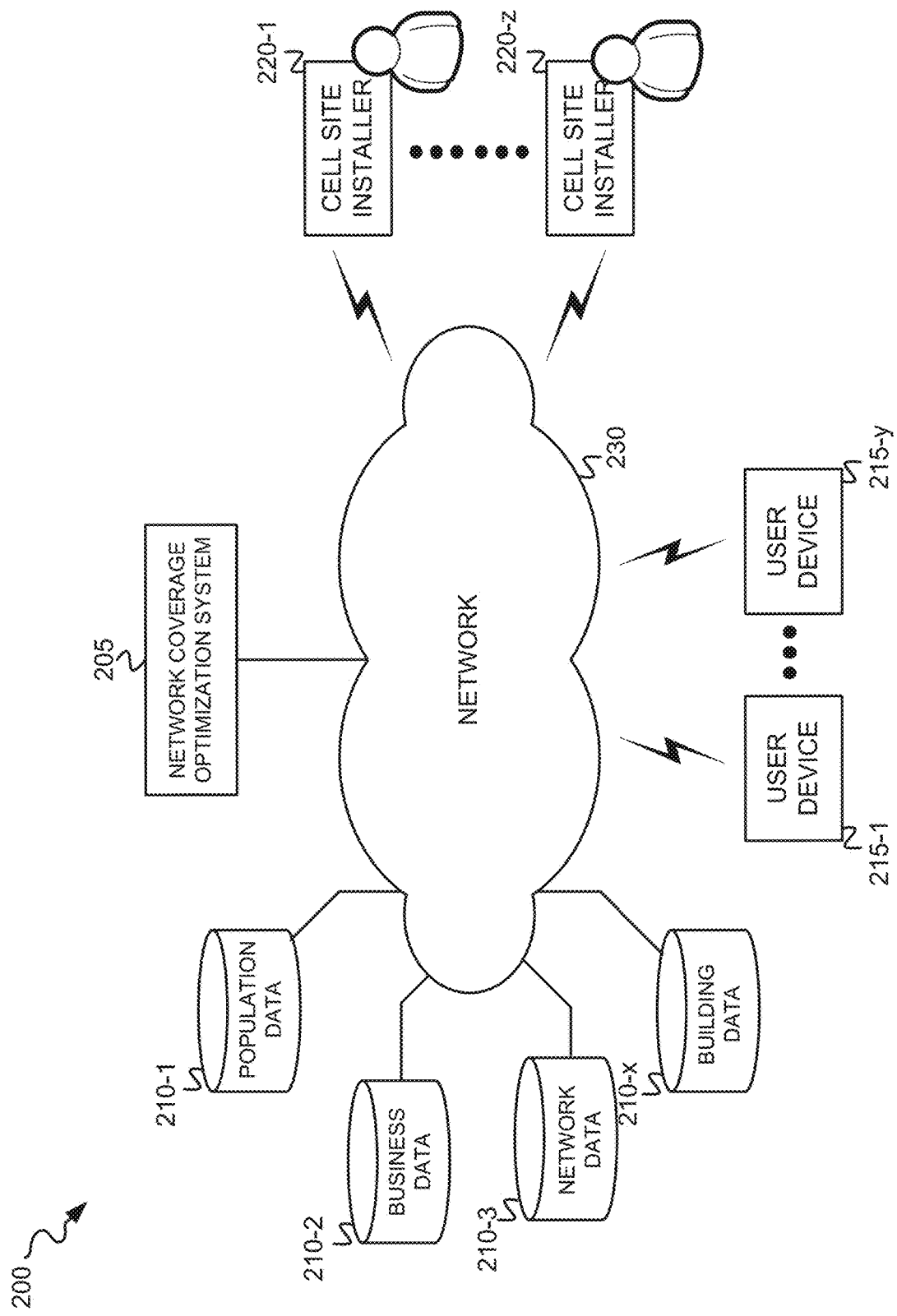
FIG. 2 is a diagram that depicts an exemplary environment in which the network coverage optimization system of FIG. 1 may operate within a wireless network.

FIG. 2 is a diagram that depicts an exemplary environment 200 in which the network coverage optimization system of FIG. 1 may operate to optimize the number, type, and placement of wireless RF sites within a wireless network. Network environment 200 may include a network coverage optimization system 205, multiple data storage sites 210-1 through 210-x, multiple user devices 215-1 through 215-y, one or more cell site installers 220-1 through 220-z, and a network 230.

Network coverage optimization system 205 includes one or more network devices that use machine learning and linear programming to optimize the number, type, and placement of cell sites within a wireless network. Network coverage optimization system 205 may implement forecast engine 105, machine learning engine 115, and/or mixed linear programming engine 130 of FIG. 1, and may also implement other engines/units, such as those described with respect to FIG. 4 below.

Data storage sites 210-1 through 210-x may each include one or more network devices that store data related to, for example, population, businesses, wireless networks, and building construction. Population data 210-1 may store population data over time by, for example, census block group (CBG). The population data may include U.S. census data that is published periodically. Business data 210-2 may store data on businesses and POIs by location, types of business, and employee count for each business/POI. Network data 210-3 may store information related to one or more wireless networks, including cell site locations and particular types of wireless network equipment installed at the cell sites in the wireless networks and measured network performance data. Network data 210-3 may include, for example, existing wireless site locations, wireless site coverage areas, and network "no coverage" areas. Network data 210-3 may additionally store market share information, by CMA and city, for each wireless network provider. Building data 210-x may store commercial and residential building permit data over time, indicating the historical issuance of building permits for commercial and residential development.

User devices 215-1 through 215-y (referred to herein as "user devices 215" or "user device 215") and cell site installer devices 220-1 through 220-z (referred to herein as "cell site installer devices 220" or "cell site installer device 220") may each include a computational device that includes network communication capabilities. User devices 215 and cell site installer devices 220 may each include, for example, a desktop, laptop, palmtop or tablet computer; a cellular telephone (e.g., smart phone); or a personal digital assistant (PDA). User devices 215 and cell site installer devices 220 may each connect to network 230 via wired or wireless links.

Users devices 215 may be carried, owned, and/or operated by users (not shown) that may desire to access network coverage optimization recommendations and results from network coverage optimization system 205. Cell site installer devices 220 may be carried, owned, and/or operated by individuals engaged in cell site installation throughout the wireless network service provider's wireless network. Cell site installer devices 220 may receive network coverage optimization recommendations and results from system 205 for use in the field in installing cell sites in the wireless network.

Network 230 may include one or more wired or wireless networks. The wireless networks may include, for example, wireless PLMNs, wireless satellite networks, and/or other types of wireless networks (e.g., wireless ad-hoc networks, wireless Wide Area Networks (WANs)). The PLMN(s) may include a Code Division Multiple Access (CDMA) 2000 PLMN, a Global System for Mobile Communications (GSM) PLMN, a Long Term Evolution (LTE) PLMN and/or other types of PLMNs. The wired networks, or other types of networks, may include, for example, a telecommunications network (e.g., a PSTN), a local area network (LAN), a wide area network (WAN), a metropolitan area network (MAN), an intranet, the Internet, or a cable network (e.g., an optical cable network).

The configuration of network components of network environment 200 shown in FIG. 2 is for illustrative purposes. Other configurations may be implemented. Therefore, network environment 200 may include additional, fewer and/or different components that may be configured in a different arrangement than that depicted in FIG. 2.

Figure 3:
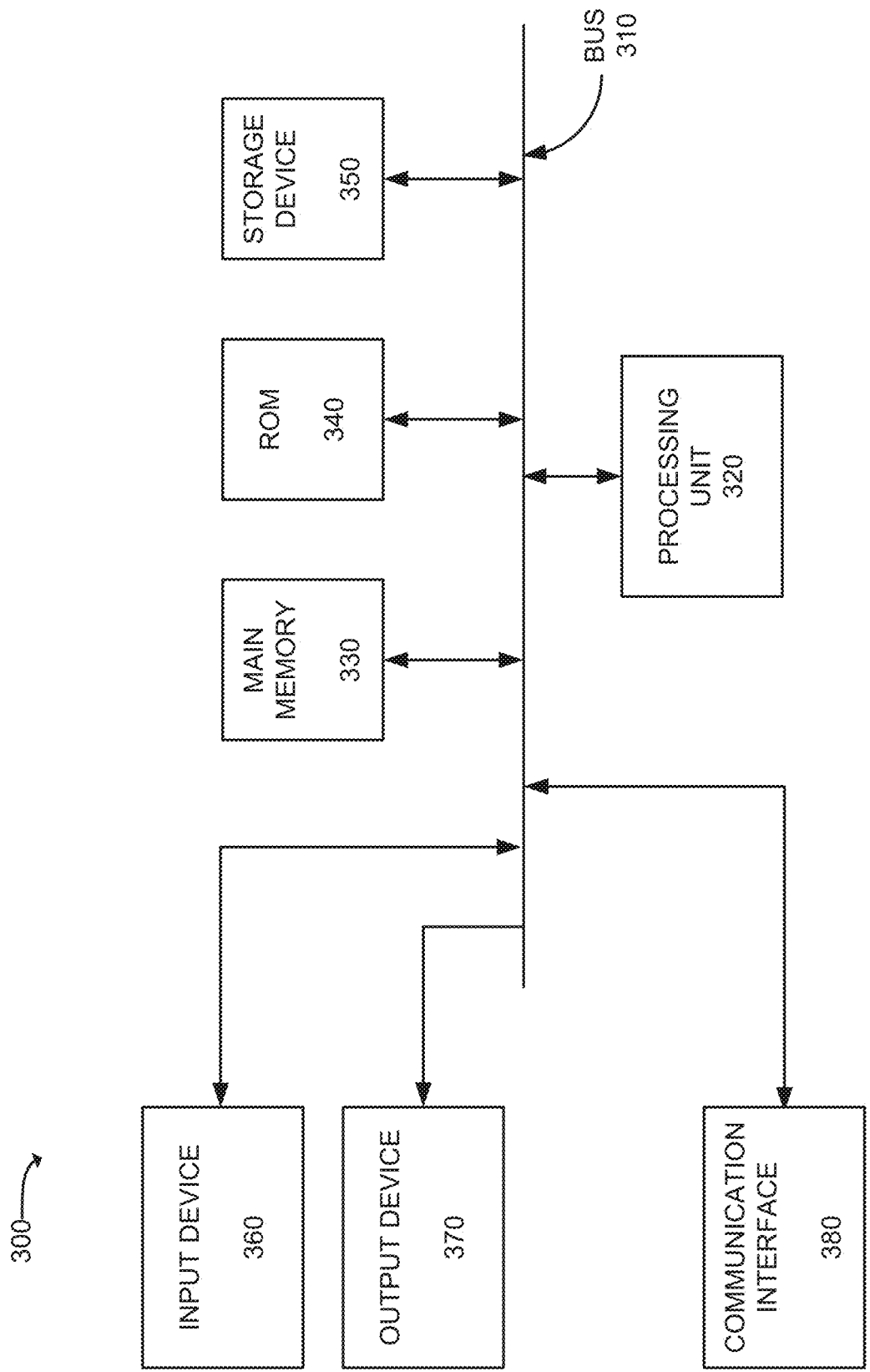
FIG. 3 is a diagram that depicts exemplary components of a network device.

FIG. 3 is a diagram that depicts exemplary components of a network device 300. Network coverage optimization system 205, data storage sites 210, user devices 215, and cell site installer devices 220 may each include components the same as, or similar to, the network device 300 shown in FIG. 3, arranged in a same, or similar, configuration, as that shown in FIG. 3. Network device 300 may include a bus 310, a processing unit 320, a main memory 330, a read only memory (ROM) 340, a storage device 350, an input device 360, an output device 370, and a communication interface 380. Bus 310 may include a path that permits communication among the other components of network device 300.

Processing unit 320 may include one or more processors or microprocessors which may interpret and execute stored instructions associated with one or more processes, or processing logic that implements the one or more processes. For example, processing unit 320 may include, but is not limited to, programmable logic such as Field Programmable Gate Arrays (FPGAs) or accelerators. Processing unit 320 may include software, hardware, or a combination of software and hardware for executing the processes described herein. Main memory 330 may include a random access memory (RAM) or another type of dynamic storage device that may store information and, in some implementations, instructions for execution by processing unit 320. ROM 340 may include a ROM device or another type of static storage device (e.g., Electrically Erasable Programmable ROM (EEPROM)) that may store static information and, in some implementations, instructions for use by processing unit 320. Storage device 350 may include a magnetic, optical, and/or solid state (e.g., flash drive) recording medium and its corresponding drive. Main memory 330, ROM 340 and storage device 350 may each be referred to herein as a "non-transitory computer-readable medium" or a "non-transitory storage medium." The process/methods set forth herein can be implemented as instructions that are stored in main memory 330, ROM 340 and/or storage device 350 for execution by processing unit 320.

Input device 360 may include one or more devices that permit an operator to input information to network device 300, such as, for example, a keypad or a keyboard, a display with a touch sensitive panel, voice recognition and/or biometric mechanisms, etc. Output device 370 may include one or more devices that output information to the operator, including a display, a speaker, etc. Input device 360 and output device 370 may, in some implementations, be implemented as a user interface (UI) that displays UI information and which receives user input via the UI. Communication interface 380 may include one or more transceivers that enable network device 300 to communicate with other devices and/or systems. For example, communication interface 380 may include one or more wired or wireless transceivers for communicating via network 230.

Network device 300 may perform certain operations or processes, as may be described herein. Network device 300 may perform these operations in response to processing unit 320 executing software instructions contained in a computer-readable medium, such as memory 330. A computer-readable medium may be defined as a physical or logical memory device. A logical memory device may include memory space within a single physical memory device or spread across multiple physical memory devices. The software instructions may be read into main memory 330 from another computer-readable medium, such as storage device 350, or from another device via communication interface 380. The software instructions contained in main memory 330 may cause processing unit 320 to perform the operations or processes, as described herein. Alternatively, hardwired circuitry (e.g., logic hardware) may be used in place of, or in combination with, software instructions to implement the operations or processes, as described herein. Thus, exemplary implementations are not limited to any specific combination of hardware circuitry and software.

The configuration of components of network device 300 illustrated in FIG. 3 is for illustrative purposes only. Other configurations may be implemented. Therefore, network device 300 may include additional, fewer and/or different components, arranged in a different configuration, than depicted in FIG. 3.

Figure 4:
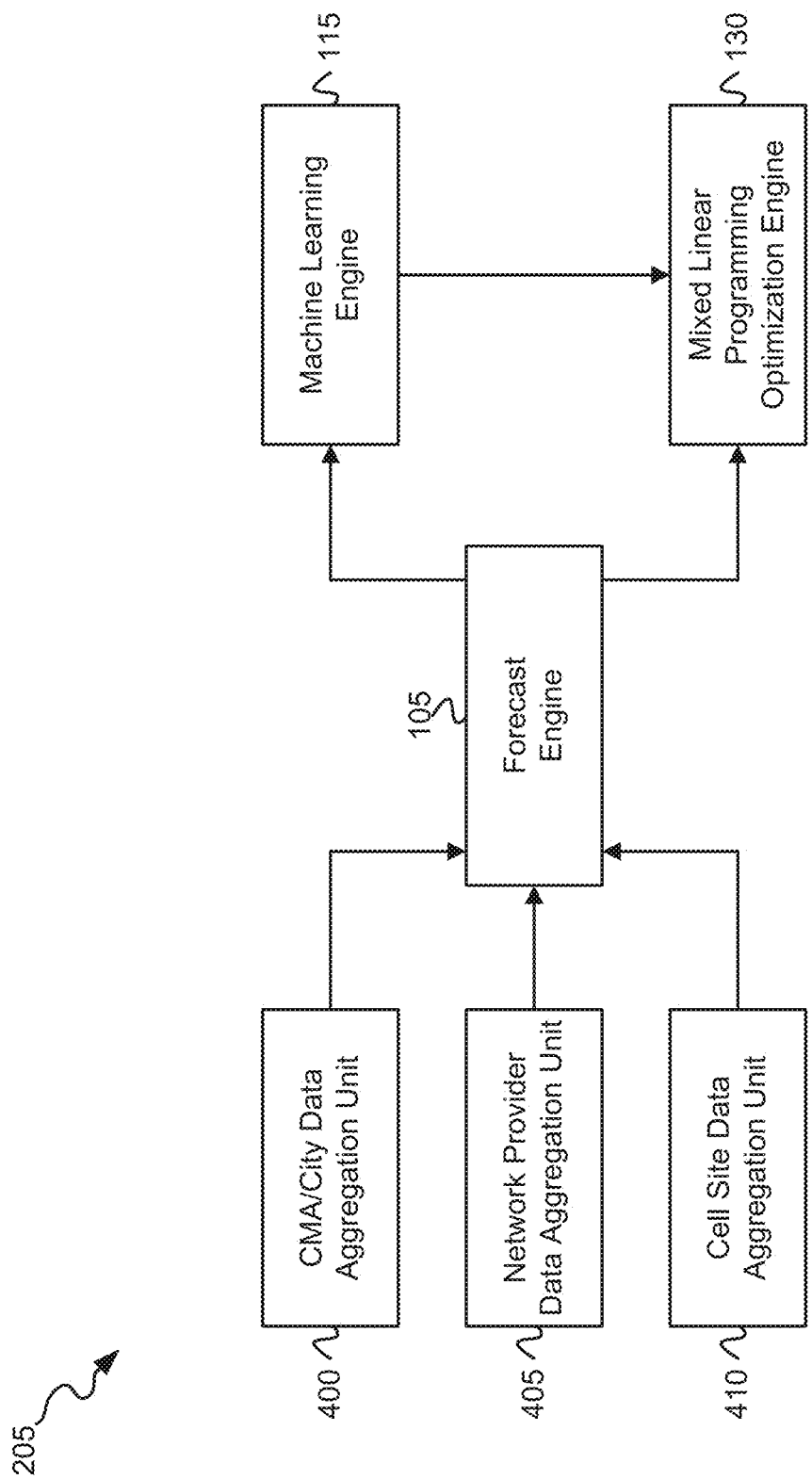
FIG. 4 is a diagram that illustrates exemplary functional components of the network coverage optimization system of FIGS. 1 and 2.

FIG. 4 is a diagram that illustrates exemplary functional components of network coverage optimization system 205. Each of the units/engines shown in FIG. 4 may be implemented as software instructions executed by processing unit 320 of a network device 300, or may be implemented as hardware, or a combination of hardware and software. Network coverage optimization system 205 may include a CMA/City data aggregation unit 400, a network provider data aggregation unit 405, a cell site data aggregation unit 410, a forecast engine 105, a machine learning engine 115, and a mixed linear programming optimization engine 130.

CMA/City data aggregation unit 400 obtains population data from, for example, population data storage 210-2, and groups the population data by CMA and city. Unit 400 may additionally obtain business data from, for example, business data storage 210-2, and group the business data by CMA and city. The business data (e.g., Dunn and Bradstreet data) may include, for example, identifications of businesses and POIs by location, type, and employee count within each CMA and city. Unit 400 may further obtain building data from, for example, building data storage 210-x and groups the building data by CMA and city. The building data may include data relating to building permits issued, per CMA and city, for business and residential building construction.

Network provider data aggregation unit 405 obtains wireless network provider market data (e.g., Mosaik data) from, for example, network data storage 210-3. The network provider market data may include market share data, per CMA and city, for multiple wireless network service providers.

Cell site data aggregation unit 410 obtains wireless network data from, for example, network data storage 210-3. The wireless network data may include, for example, existing cell site locations and particular types of wireless network equipment installed at the wireless sites in the wireless networks. The wireless network data may further include historical measured network performance parameters (e.g., number of dropped calls, frequency of low throughput connections, signal strength) at existing cell sites. The wireless network data may further define coverage areas associated with each existing wireless site, and "no coverage" areas within the wireless network.

Forecast engine 105, as already described, forecasts future population growth rates by CMA/city, future residential and business building construction growth rates by CMA/city, and CMAs/cities where competitors will likely, in the future, exceed the wireless network service provider's market share. Forecast engine 105 identifies CMAs and/or cities for designation as possible cell site installation sites based on existing population and residential/business units and further based on the forecasted population growth rates, building construction growth rates, and competitors' market share per CMA/city.

Machine learning engine 115 may, as already described, perform machine learning techniques to predict network performance parameters associated with prospective cell sites assuming installation of those prospective cell sites within an identified CMA/city. In one implementation, the machine learning techniques may include creating a random forest regression model, or a random forest classification model, to predict network performance parameters of prospective cell sites, when installed, and identify particular prospective cell sites with sufficiently high predicted improvements in network performance parameters.

Mixed linear programming optimization engine 130 may, as already described, implement mixed linear programming, using predicted improvements in network performance parameters associated with each of the identified prospective wireless sites, and applying resource, and other, constraints to optimize wireless sites within each identified CMA/city so as to maximize improvements in network performance parameters. Engine 130, based on the optimization to maximize improvements in network performance parameters, may provide wireless site placement recommendations that may be used for installing new wireless sites within the wireless network.

The configuration of the functional components of network coverage optimization system 205 illustrated in FIG. 4 is for illustrative purposes only. Other configurations may be implemented. Therefore, network coverage optimization system 205 may implement additional, fewer and/or different functions than those shown in FIG. 4.

Figure 5:
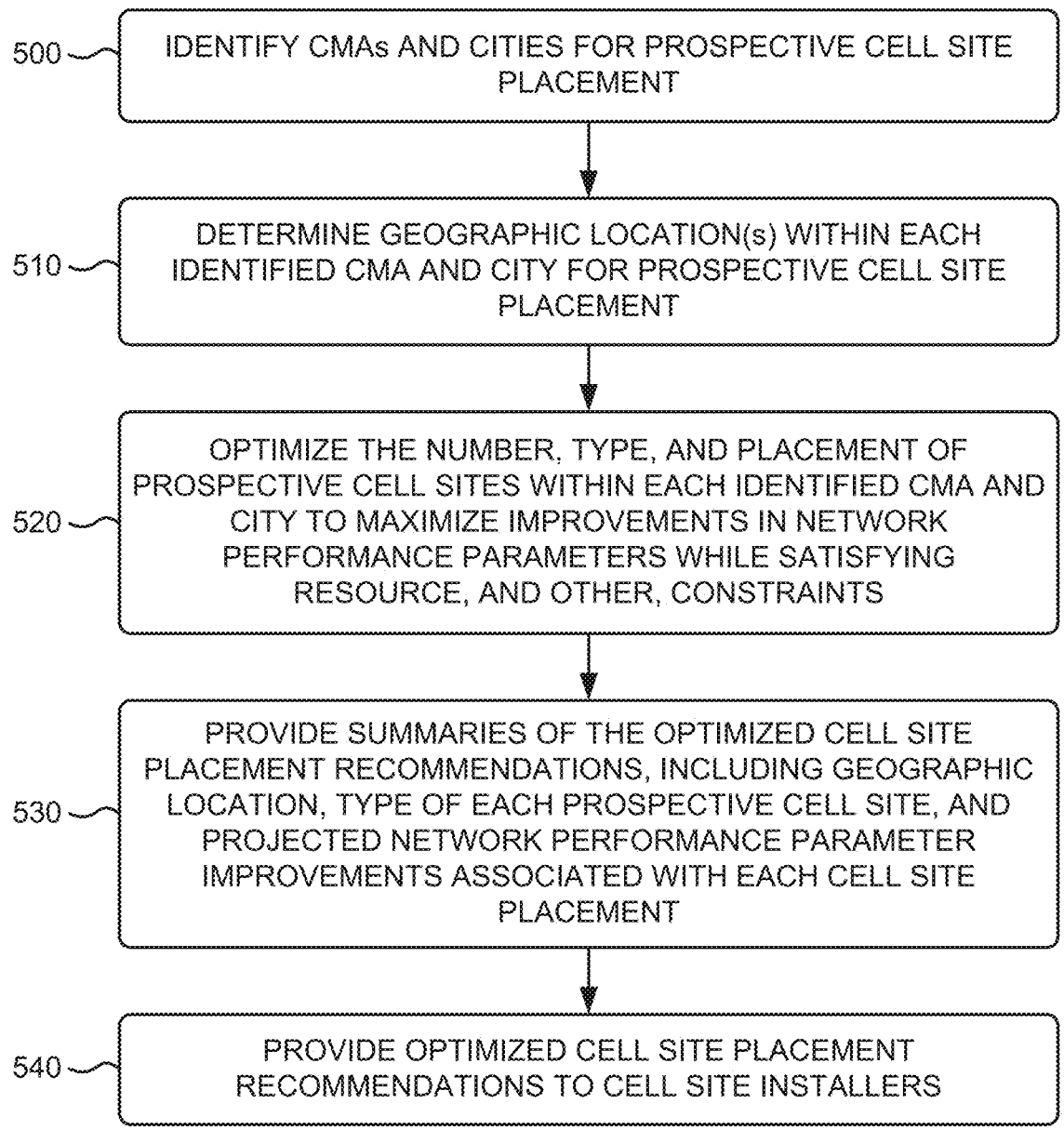
FIG. 5 is a flow diagram that illustrates an exemplary process to optimize cell sites within a wireless network.

FIG. 5 is a flow diagram that illustrates an exemplary process for using machine learning to forecast network performance improvements associated with the installation of candidate cell sites in a wireless network and using mixed linear programming to optimize the number, type, and placement of the candidate cell sites within the wireless network. The exemplary process of FIG. 5 may be implemented by network coverage optimization system 205.

The exemplary process includes network coverage optimization system 205 identifying CMAs and cities for prospective cell site placement (block 500). Forecast engine 105 of network coverage optimization system 205 may obtain various different types of data related to CMAs and cities for performing forecasting, including (but not limited to) population data for each CMA/city as a function of time, existing residential and business units as a function of time, "no coverage" areas within each CMA/city, the issuance of residential and business building permits over time in each CMA/city, and data on competitors' market shares by CMA/city. Forecast engine 105 may forecast, based on the various types of data, future population growth rates by CMA/city, future residential and business building construction growth rates by CMA/city, and CMAs/cities where competitors will likely, in the future, exceed the wireless network service provider's market share. Forecast engine 105 may further identify CMAs and/or cities for possible cell site installation based on the existing population and residential/business units per CMA/city and further based on the forecasts of population growth rates, building construction growth rates, and competitors' market share per CMA/city. One exemplary implementation of block 500 of FIG. 5 is described in further detail below with respect to the process of FIGS. 6A and 6B.

Network coverage optimization system 205 determines geographic location(s) within each identified CMA and city for prospective cell site placement (block 510). Machine learning engine 115 of network coverage optimization system 205 may obtain various different types of data related to the CMAs and cities, such as, for example, population and population density data for each CMA/city, population growth rate data for each CMA/city, "no coverage" areas in each CMA/city, residential and business building construction growth rates for each CAM/city, housing and housing density data for each CMA/city, business and business density data for each CMA/city, points of interest (POIs) data for each CMA/city, and POI densities for each CMA/city. Based on the obtained data, machine learning engine 105 may perform machine learning techniques to predict network performance improvements associated with installing/building the prospective cell sites within each identified CMA/city.

In one implementation, the machine learning techniques may include creating a random forest regression model, or a random forest classification model, to associate the data volumes and measured network performance parameters, associated with traffic handled by existing cell sites, with specific counts of types of POIs, POI densities, population counts, population densities, housing counts, and/or housing densities that are associated with those existing cell sites. The created random forest regression/classification model may then be used to predict network performance parameters associated with prospective cell sites if those cell sites were to be installed/built. Based on the predicted network performance parameters associated with prospective cell sites, machine learning engine 115 may identify those prospective cell sites, and those cell sites' geographic locations within the CMAs/cities, having specified levels of improvement in network performance parameters for designation as the new cell sites to be installed. One exemplary implementation of block 510 of FIG. 5 is described in further detail below with respect to the process of FIGS. 8A and 8B.

Network coverage optimization system 205 optimizes the number, type, and placement of prospective cell sites within each identified CMA and city so as to maximize improvements in network performance parameters while satisfying resource, and other, constraints (block 520). Using the identified prospective cell sites within the CMAs/cities (e.g., identified in block 510), mixed linear programming optimization engine 130 of network coverage optimization system 205 determines resource requirements $r_i$ associated with installing/building each cell site i of a set I of identified prospective cell sites and determines projected improvements $c_i$ in network performance parameters associated with installing/building each cell site i of the set I of identified prospective cell sites. Engine 130 further implements mixed linear programming, using the determined resource requirements $r_i$ and network performance parameter improvements and applies resource, and other, constraints to optimize wireless sites within each identified CMA/city and maximize improvements in network performance. The resource constraints may include, for example, a national resource constraint (N) that includes a nationwide limitation on one or more resources. One exemplary implementation of block 520 of FIG. 5 is described in further detail below with respect to the process of FIG. 9.

Network coverage optimization system 205 provides summaries of cell site placement recommendations, including geographic locations, types of each prospective cell site, and projected network performance parameter improvements associated with placement of each prospective cell site (block 530). Mixed linear programming engine 130 of network coverage optimization system 205, based on the optimization to maximize the improvements in network performance parameters of block 530, may provide wireless site placement recommendations with a prospective cell site summary. For each different constraint (e.g., different national resource constraints) scenario, engine 130 may generate a prospective cell site summary that includes wireless site placement recommendations for that particular constraint scenario. Engine 130 may provide the wireless site placement recommendations in a "push" or "pull" manner. In a "push" situation, engine 130 may electronically transmit the wireless site placement recommendations directly to particular devices upon completion of the mixed linear programming optimization (e.g., to devices carried by cell site installers). In a "pull" situation, engine 130 may electronically supply the wireless site placement recommendations upon request by user devices, such as via a web server when the user devices access the web server. One exemplary implementation of block 530 of FIG. 5 is described in further detail below with respect to the process of FIG. 10. Network optimization system 205 may provide optimized cell site placement recommendations to cell site installers 220 (block 540). The optimized cell site placement recommendations may include the summaries generated by block 530. In some implementations, block 540 may be selectively omitted from the process of FIG. 5.

Figure 6A:
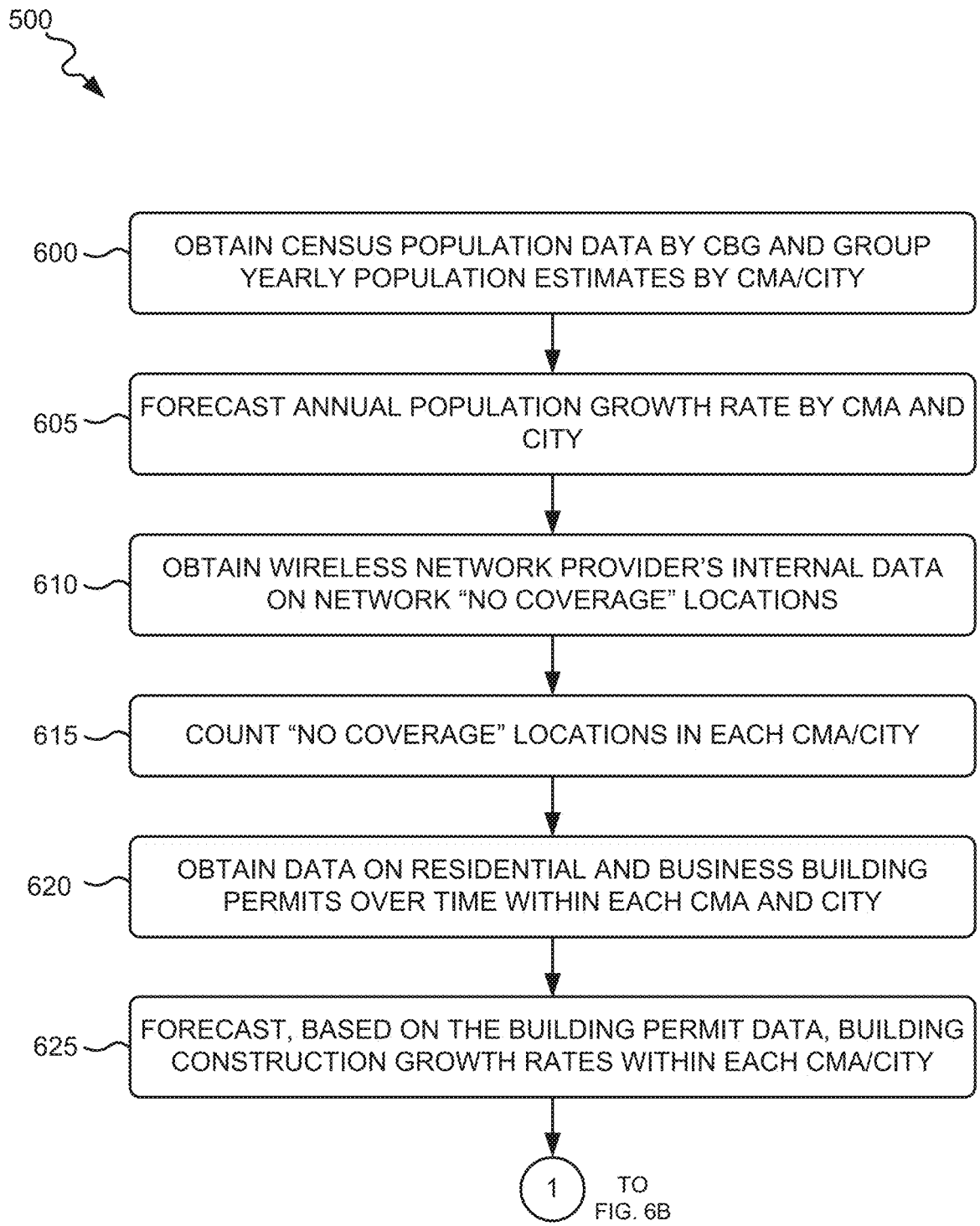
FIGS. 6A and 6B are flow diagrams that illustrate one exemplary implementation of block 500 of the process of FIG. 5.
Figure 6B:
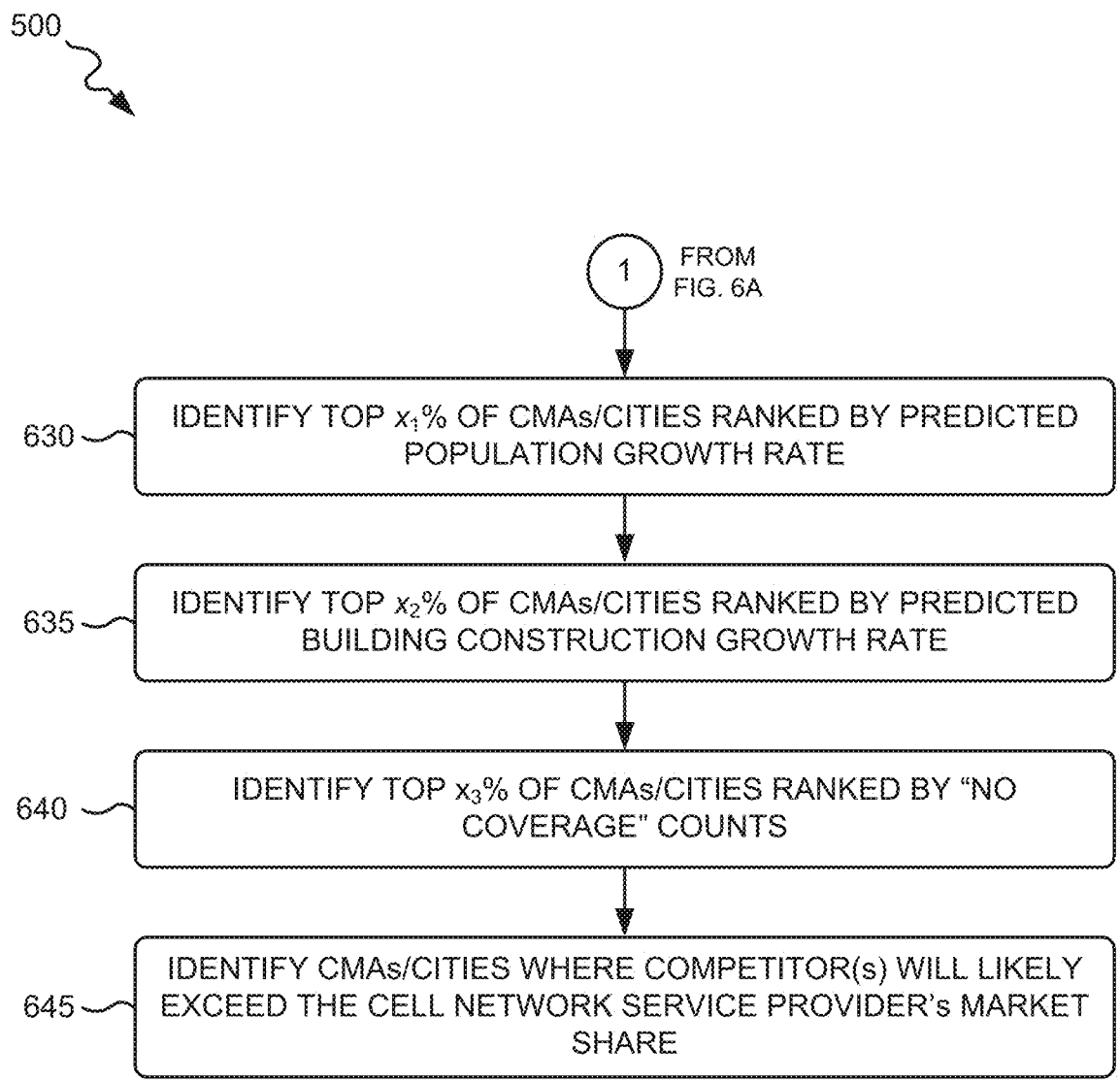

FIGS. 6A and 6B are flow diagrams that illustrate one exemplary implementation of block 500 of the exemplary process of FIG. 5. The exemplary process of FIGS. 6A and 6B may be implemented by network coverage optimization system 205.

The exemplary process includes forecast engine 105 of network coverage optimization system 205 obtaining census population data by CBG and grouping the yearly population estimates by CMA/city (block 600). The population data may include annual estimates of population data generated by, for example, the U.S. Census Bureau. CMA/city data aggregation unit 400 may divide the population data, published by CBG, into population data per CMA or city, and supplies the population data to forecast engine 105.

Forecast engine 105 forecasts a future annual population growth rate by CMA and city (block 605). Forecast engine 105, based on a time series historical analysis of the annual population growth rate in each CMA and city, determined from the population data of block 600, forecasts future population growth rates (e.g., population growth rate as a function of time) for each CMA and city.

Figure 7:
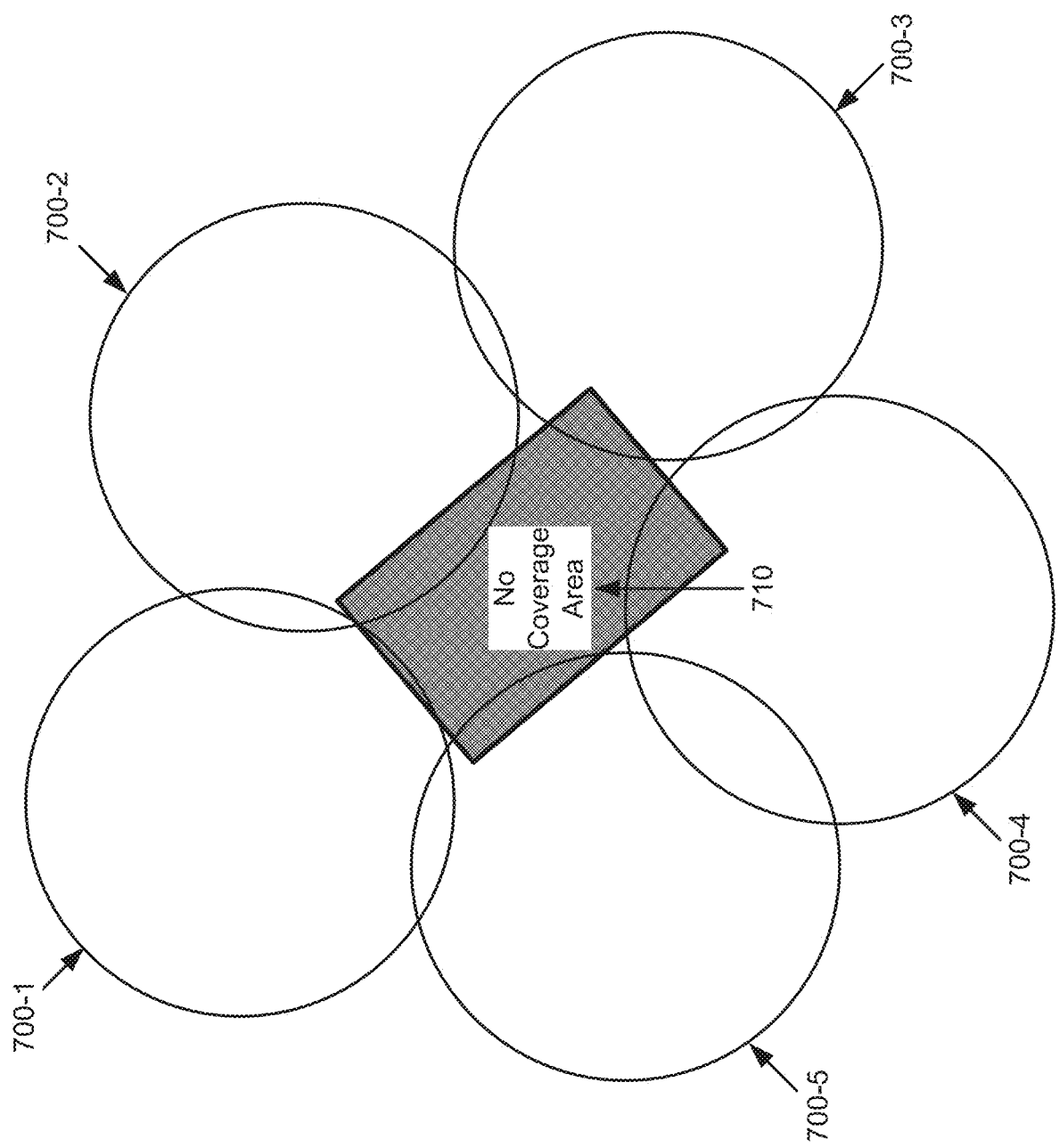
FIG. 7 illustrates a simplified example of a region of a wireless network.

Forecast engine 105 obtains the wireless network provider's internal data on network "no coverage" locations (block 610) and counts the "no coverage" locations in each CMA/city (block 615). Forecast engine 105 obtains the "no coverage" locations, within the wireless network service provider's wireless network, within each CMA and city, from network provider data aggregation unit 405. The data describing the "no coverage" locations may identify a geographic location(s), or geographic area, where no wireless coverage is provided by the wireless network, or where wireless coverage is sufficiently poor as to be considered "no coverage." Each "no coverage" location may, therefore, include a geographic space in which wireless network coverage does not exist. FIG. 7 illustrates a simplified example of a region of a wireless network that includes a "no coverage" area. As shown, multiple cells 700-1 through 700-5 provide radio coverage within a particular region. However, due to the location and configuration of the particular coverage areas of each of the multiple cells 700-1 through 700-5, a "no coverage" area 710 exists in between the cells 700. Within "no coverage" area, a wireless device may be unable to send and/or receive data via the wireless network.

Forecast engine 105 may count, within each CMA and city, each geographic location/area at which a "no coverage" location exists to generate an integer number of "no coverage" locations. Alternatively, forecast engine 105 may determine an area (e.g., in square meters) associated each "no coverage" location, and determine an overall area per CMA or city by summing the individual areas associated with each "no coverage" location throughout the CMA or city.

Forecast engine 105 obtains data on building permits over time within each CMA and city (block 620) and forecasts, based on the building permit data, future building construction growth rates within each CMA/city (block 625). Forecast engine 105 may obtain the building permit data, for existing business and residential building construction, from CMA/city data aggregation unit 400. The building permit data may include permits issued for residential and business building construction spanning multiple years (e.g., the previous 20 years) within each CMA and city. Forecast engine 105, based on a time series historical analysis of the building permit issuance rate in each CMA and city, determined from the building permit data of block 620, forecasts future residential and business building permit issuance rates (e.g., permit issuance rates as a function of time) for each CMA and city and, thereby, forecasts future building construction growth rates within each CMA/city.

Forecast engine 105 identifies a top $x_1$ % of CMAs/cities ranked by predicted population growth rate (block 630). Forecast engine 105 ranks the CMAs and cities, by the population growth rates forecasted in block 605 for each CMA/city, and then identifies the top $x_1$ % of the ranked CMAs/cites, where $x_i$ may include any number between 0 and 100. As a simplified example, if $x_1$ is equal to 20, and five CMAs are ranked, by population growth rate, in the following order (highest ranking to lowest ranking): $CMA_4$, $CMA_1$, $CMA_2$, $CMA_5$, $CMA_3$, then the top 20% of the ranked CMAs would include only the top ranked $CMA_4$.

Forecast engine 105 identifies a top $x_2$ % of CMAs/cities ranked by predicted building construction growth rate (block 635). Forecast engine 105 ranks the CMAs and cities, by the building construction growth rates forecasted in block 625 for each CMA/city, and then identifies the top $x_2$ % of the ranked CMAs/cites, where $x_2$ may include any number between 0 and 100. As a simplified example, if $x_2$ is equal to 30, and ten CMAs are ranked, by population growth rate, in the following order (highest ranking to lowest ranking): $CMA_2$, $CMA_4$, $CMA_7$, $CMA_9$, $CMA_1$, $CMA_6$, $CMA_5$, $CMA_8$, $CMA_{10}$, $CMA_3$, then the top 30% of the ranked CMAs would include only the three top ranked CMAs: $CMA_2$, $CMA_4$, $CMA_7$.

Forecast engine 105 identifies a top $x_3$ % of CMAs/cities ranked by "no coverage" counts (block 640). Forecast engine 105 ranks the CMAs and cities, by the "no coverage" counts determined in block 615 for each CMA/city, and then identifies the top $x_3$ % of the ranked CMAs/cities, where $x_3$ may include any number between 0 and 100. As one example, the CMAs and cities may be ranked by a number of "no coverage" areas contained in each CMA/city, with a higher number of individual "no coverage" areas equating to a higher rank than a lower number of "no coverage" areas. As another example, the CMAs and cities may be ranked by an amount of overall area (e.g., in square meters) in each CMA/city that consists of "no coverage" areas, with a higher amount of "no coverage" area equating to a higher rank than a lower amount of "no coverage" area. As a specific example, a first CMA having 20 "no coverage" areas within the CMA may be ranked higher than a second CMA having 5 "no coverage" areas within that CMA. As another specific example, a first CMA having 2000 square meters of "no coverage" area may be ranked higher than a second CMA having only 1000 square meters of "no coverage" area.

Forecast engine 105 identifies CMAs/cities where competitor(s) will likely exceed the cell network service provider's market share (block 645). Forecast engine 105 obtains cell network service provider historical market share data from network provider data aggregation unit 405. Based on a historical analysis of the wireless network market share of multiple wireless network service providers having wireless networks that serve each CMA/city, forecast engine 105 may forecast the future relative market shares of the multiple different wireless network service providers in each CMA and city. Forecast engine 105 may compare the forecasted future market share of a particular wireless network service provider with the forecasted future market shares of other competing wireless network service providers to determine the likelihood that the competitors' market shares may exceed the particular wireless network service provider.

The CMAs and cities, identified in blocks 630, 635, 640, and 645, constitute the CMAs/cities identified for prospective cell site placement of block 500 of FIG. 5. Therefore, each of the CMAs and cities identified in blocks 630, 635, 640, and 645 represent the CMAs and cities that are identified for new cell site placement.

Figure 8A:
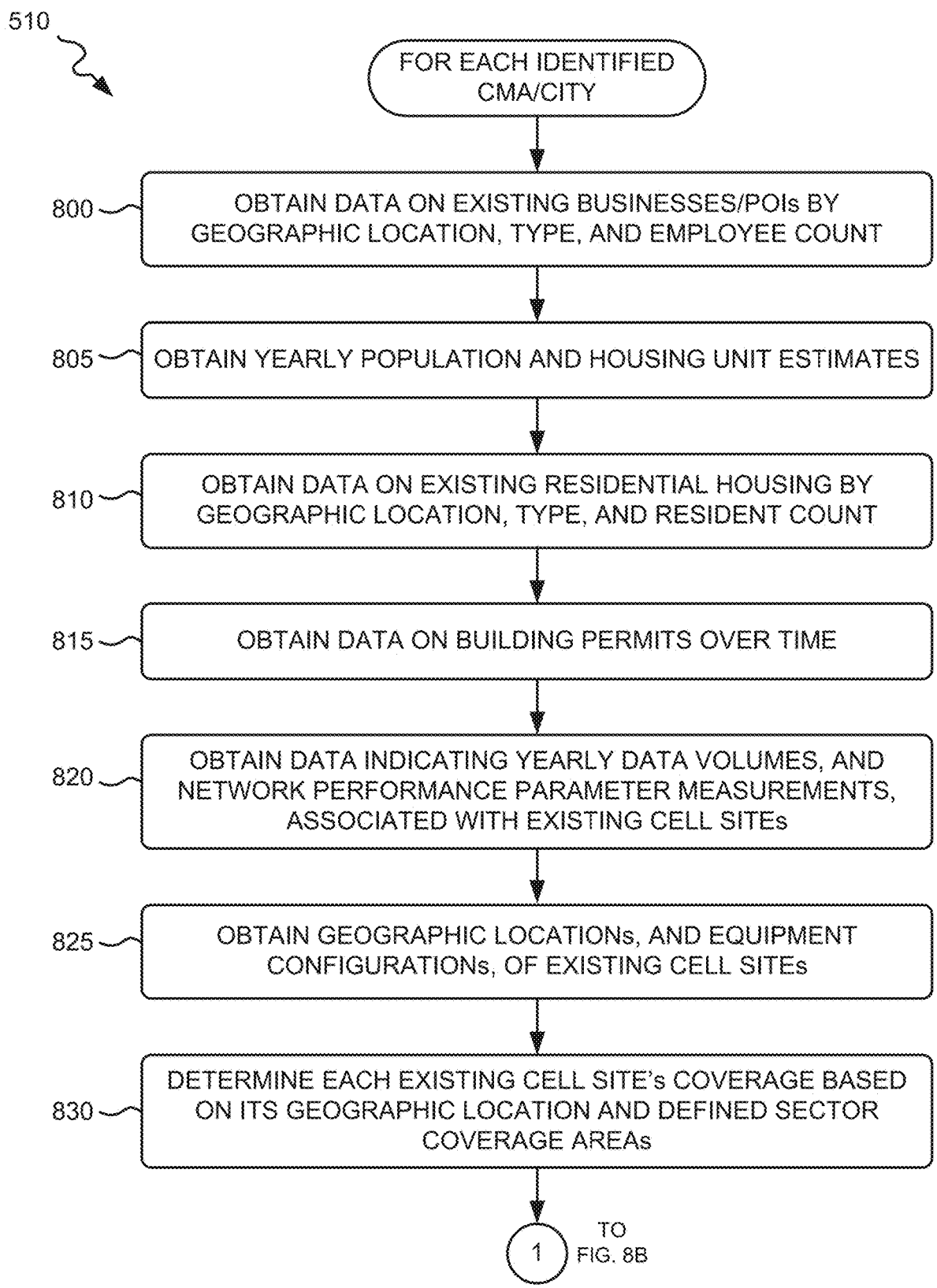
FIGS. 8A and 8B are flow diagrams that illustrate one exemplary implementation of the process of FIG. 5.
Figure 8B:
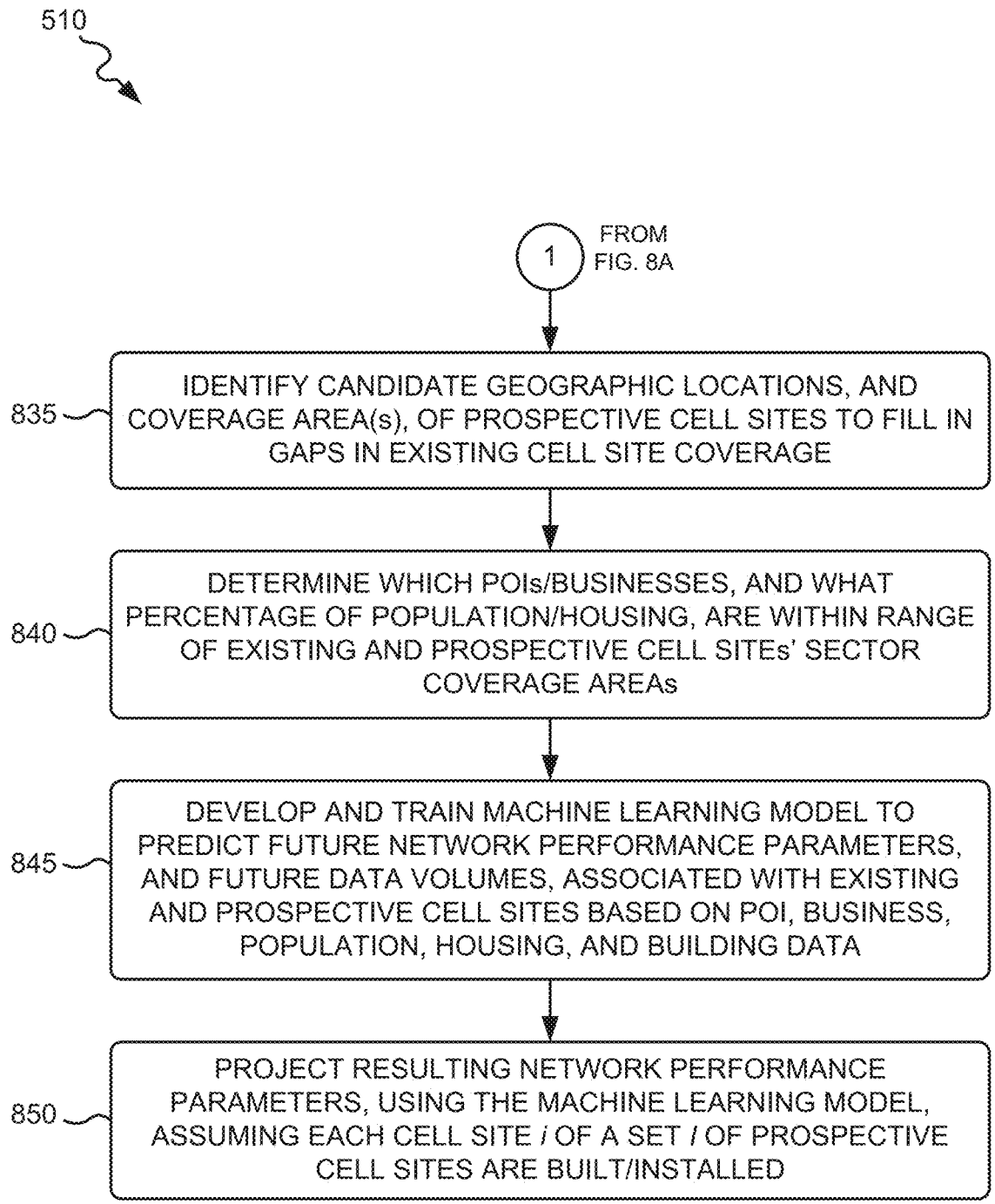

FIGS. 8A and 8B are flow diagrams that illustrate one exemplary implementation of block 510 of the process of FIG. 5. Blocks 800-850 of FIGS. 8A and 8B may be repeated (e.g., executed in parallel) for each CMA or city identified in block 500 of the process of FIG. 5. The exemplary process of FIGS. 8A and 8B may be implemented by network coverage optimization system 205. The exemplary process of FIGS. 8A and 8B may occur subsequent to the execution of the exemplary process of FIGS. 6A and 6B.

The exemplary process includes machine learning engine 115 of network coverage optimization system 205 obtaining data on existing businesses and/or points of interests (POIs) by geographic location, type, and employee count (block 800). Machine learning engine 115 may obtain the business data from, for example, CMA/City data aggregation unit 400. The business data may include data that originated from a third.-party source such as, for example, Dunn and Bradstreet data. The business data may describe various aspects of businesses and/or POIs that may be relevant to providing wireless network services to the businesses/POIs, including their geographic locations, the type of each business (e.g, retail, industrial), and an estimate of a number of employees/ personnel that will be present at the business on a daily basis.

Machine learning engine 115 obtains yearly population and housing unit estimates (block 805). Machine learning engine 115 may obtain the population and housing unit estimates from CMA/City data aggregation unit 400. The obtained data may include a historical record of population and housing units at, for example, a census block group (CBG) level, that may be used to determine the yearly population and housing unit counts for a particular CMA/city. The population/housing unit data may, for example, originate with the U.S. Census Bureau.

Machine learning engine 115 obtains data on existing residential housing by geographic location, type, and resident count (block 810). Machine learning engine 115 may obtain the residential housing data from, for example, CMA/City data aggregation unit 400. The residential data describe various aspects of residential housing that may be relevant to providing wireless network services to the residents of the housing, including their geographic locations, the type of each housing unit (e.g., home, apartment, condominium, mobile home), and an estimate of a number of residents that reside at each housing unit.

Machine learning engine 115 obtains data on building permits over time (block 815). Machine learning engine 115 may obtain the building permit data from CMA/City data aggregation unit 400. The building permit data may include historical counts (e.g., per year) of permits issued for residential and commercial building construction within particular jurisdictions (e.g., by county, by city). Machine learning engine 115 may obtain building permit data for the past m years for the jurisdictions within a CMA, or within a city itself, where in may be any number greater than one.

Machine learning engine 115 obtains data indicating yearly data volumes, and network performance parameter measurements, associated with existing cell sites (block 820). Machine learning engine 115 may obtain historical data, indicating yearly data volumes for each existing cell site within the CMA/city, from cell site data aggregation unit 410. The wireless network service provider may maintain records of historical data volumes handled by each cell site. Machine learning engine 115 may additionally obtain data that includes measurements of network performance parameters (e.g., number of dropped calls, frequencies of low throughput connections, etc.) associated with existing cell sites. The wireless network service provider may, either on-demand, periodically or continuously, perform measurements of performance parameters at each existing cell site, and may store the measurements (e.g., in network data 210-3) for future retrieval and analysis.

Machine learning engine 115 obtains geographic locations, and equipment configurations, of existing cell sites (block 825). Machine learning engine 115 may obtain cell site data, that describes a wireless network's existing cell sites within a CMA/city, from cell site data aggregation unit 410. The cell site data may describe, among other data, a geographic location, particular types of wireless equipment (e.g., antennas), and coverage areas of the sectors of the cell site. Machine learning engine 115 determines each existing cell site's coverage based on its geographic location and defined sector coverage areas (block 830). Machine learning engine 115, based on the cell site data of block 825, determines idealized coverage areas associated with each existing cell site. The idealized coverage areas include the geographic locations, and ranges, of each sector of the antenna(s) of each existing cell site. Machine learning engine 115 may additionally determine which POIs, businesses, and/or residential housing units are within the coverage area of each cell sector of each existing cell site.

Machine learning engine 115 identifies candidate geographic locations, and coverage area(s), of prospective cell sites to fill in gaps in the existing cell site coverage (block 835). Based on the existing cell site coverage determination of block 830, machine learning system 115 determines prospective cell sites, their geographic locations, and their coverage areas that will provide adequate wireless coverage within the gaps in wireless coverage of the existing cell sites. Machine learning engine 115 determines which POIs/businesses, and what percentage of population/housing, are within range of existing and prospective cell sites' sector coverage areas (block 840). Machine learning engine 115 analyzes the business data of block 800, the population and residential housing data of blocks 805 and 810, and compares the locations of the businesses and residential housing with the existing cell site coverage areas determined in block 830 and the prospective cell site coverage areas determined in block 835 to determine which POIs and businesses, and what percentage of housing units and population are within range of the existing cell sites' sector coverage areas and would be within range of the prospective cell sites' sector coverage areas if those prospective cells sites are installed.

Machine learning engine 115 develops and trains a machine learning regression, or classification, model to predict future network performance parameters, and future data volumes, associated with existing and prospective cell sites based on POI, businesses, population, housing and building data (block 845). The POI, business, population, housing, and building data may be obtained, or derived, from the data of blocks 800, 805, 810, 815, and 840. In one implementation, machine learning engine 115 may create a random forest model, based on training and validation data, to associate a magnitude of existing yearly data volumes with specific counts of types of POIs/businesses, POI/business densities, population counts, population densities, housing counts, and housing densities. Machine learning engine 115 may additionally create a random forest model, based on training and validation data, to associate one or more particular measured network performance parameters with specific counts of types of POIs/businesses, POI/business densities, population counts, population densities, housing counts, and housing densities. Machine learning engine 115 may, for example, create a random forest regression model, or a random forest classification model.

Machine learning engine 115 projects resulting network performance parameters, using the machine learning model, assuming each cell site i of a set I of prospective cell sites are built/installed (block 850). (block 850). Based on the future data volumes, and future network performance parameters, predicted for prospective cell sites, using the machine learning model, machine learning engine 115 projects resulting network performance parameters, assuming that each cell site i of the set I of prospective cell sites is built or installed.

Figure 9:
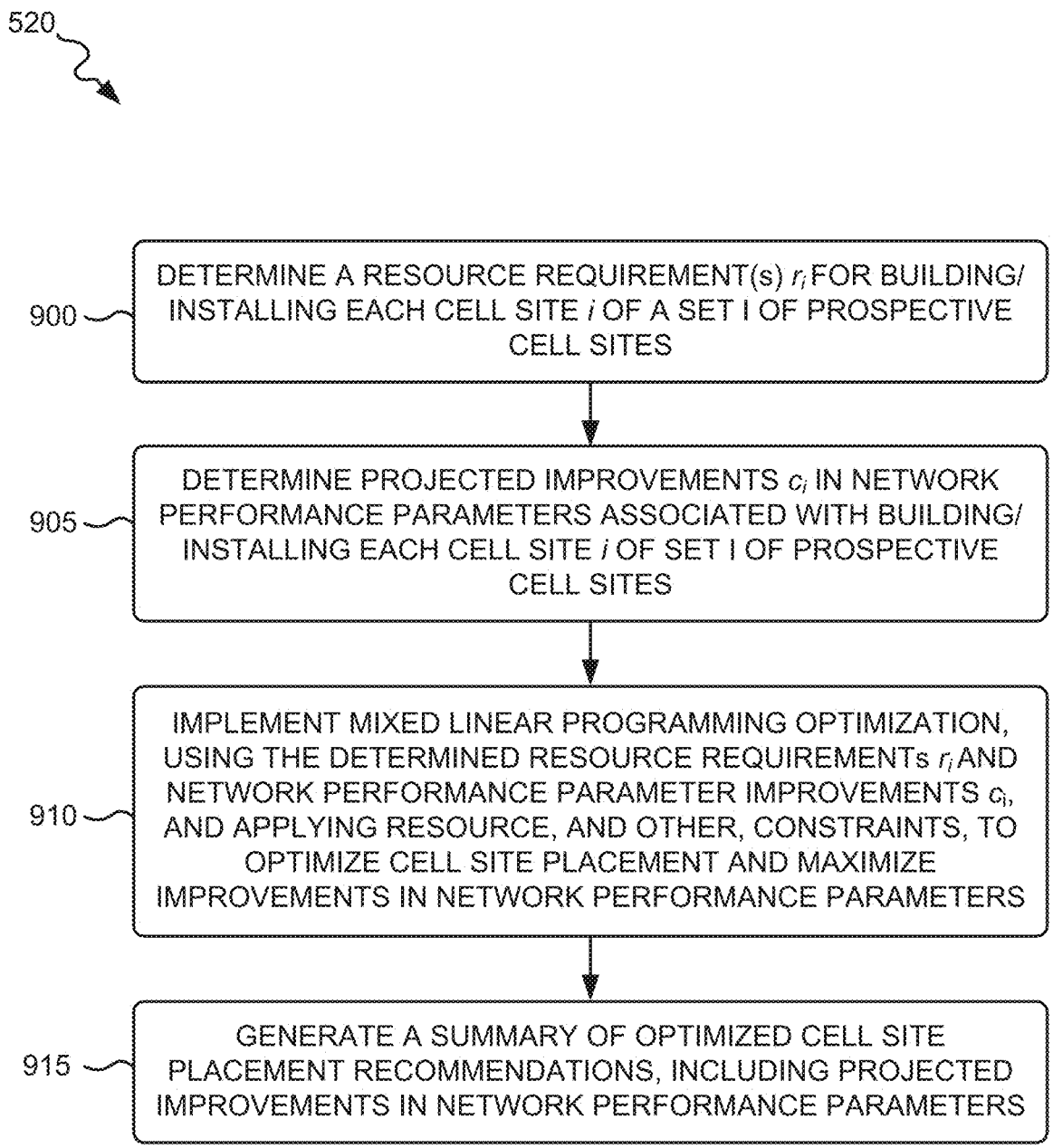
FIG. 9 is a flow diagram that illustrate one exemplary implementation of the process of FIG. 5.
Figure 10:
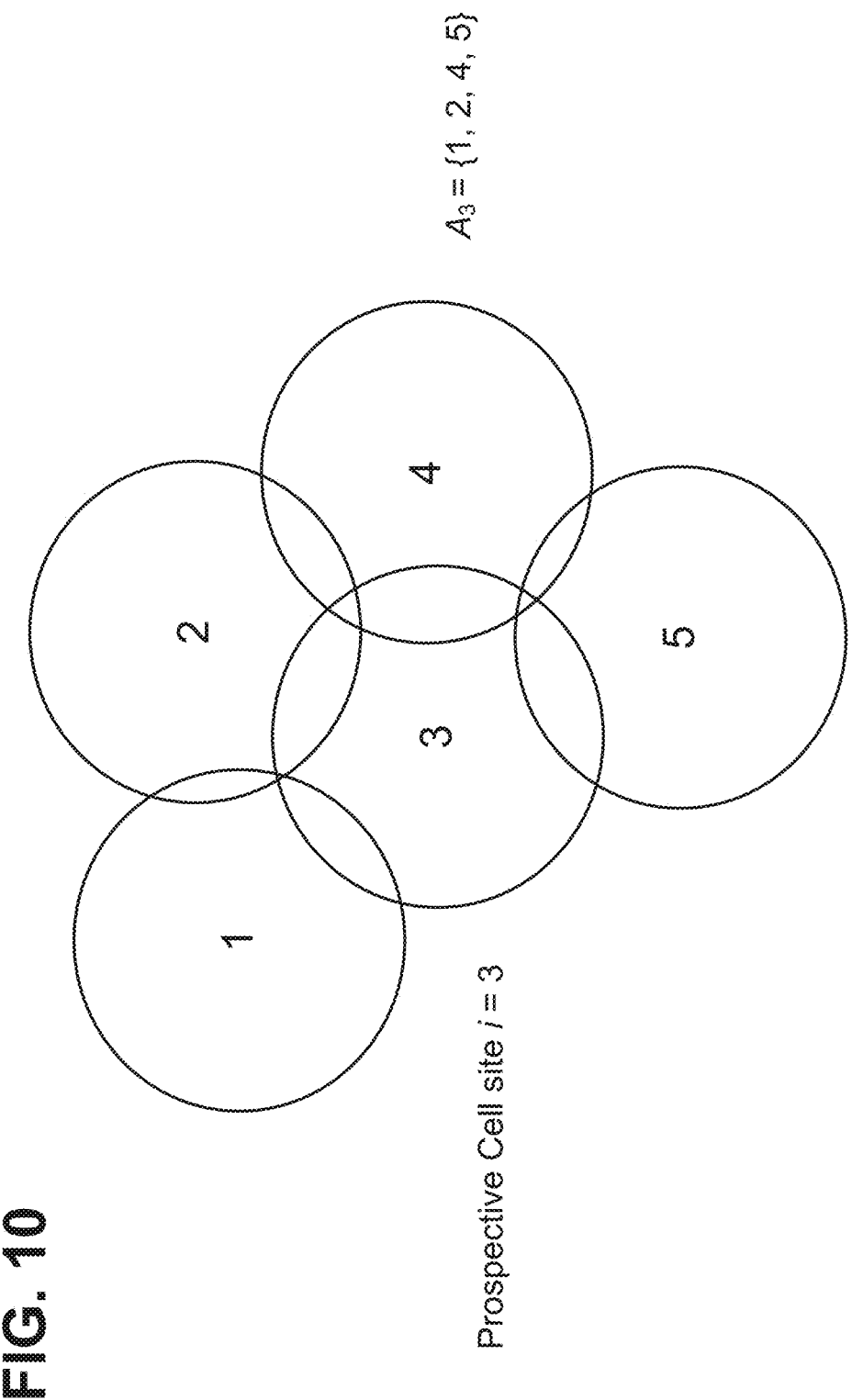
FIG. 10 illustrates an example of a set of cell sites that are adjacent to a prospective cell site i.

FIG. 9 is a flow diagram that illustrates an exemplary implementation of block 520 of the exemplary process of FIG. 5. The exemplary process of FIG. 9 may be implemented by network coverage optimization system 205. The exemplary process of FIG. 9 may occur subsequent to the execution of the exemplary processes of FIGS. 6A and 6B, and FIGS. 8A and 8B. In the exemplary process of FIG. 9, M is a set of m cell site regions, divisions, or markets (e.g., CMAs) (M=$\{1, \ldots, m\}$), I is a set of n distinct prospective cell sites (I=$\{1, \ldots, n\}$), and $A_i$ is a set of prospective cell sites that are geographically adjacent to a given prospective cell site i ($A_i \subseteq I, \forall i \in I$). FIG. 10 depicts an example of a set $A_i$ of prospective cell sites adjacent to a particular prospective cell site i. In the example shown, i=3, and the set $A_3$ of adjacent prospective cells equals $\{1, 2, 4, 5\}$.

The exemplary process includes mixed linear programming optimization engine 130 determining a resource requirement(s) $r_i$ for building or installing each cell site i of a set I of prospective cell sites (block 900). One or more types of resources $r_i$ may be required for performing and completing the building/installation of each cell site i. The types of resources $r_i$ may include, for example, monetary costs associated with equipment, hardware, and/or supplies that need to be purchased to complete the cell site i installation, and/or labor costs associated with man-hours of workers associated with installing or building the cell site i. The resources $r_i$ required by a particular cell site i may vary based on many factors, such as the type of cell site i, the market in which the cell site i is located, the season in which the cell site i is to be installed/built, etc. The determined resource requirement(s) $r(r_i \forall i \in I)$ operates as a first input into the mixed linear programming optimization.

Mixed linear programming optimization engine 130 determines projected improvements $c_i$ in network performance parameters associated with building or installing each cell site i of a set of prospective cell sites (block 905). The network performance parameters may include, for example, dropped calls, frequency of low throughput connections, signal strength, and/or distance of wireless devices to cell site location. Other, or additional, network performance parameters may be determined for use by engine 130. Engine 130 may use the network performance parameter projections from block 850 of FIG. 8B. The projected network performance parameters may be compared with measured network performance parameters of existing cell sites serving each prospective cell site i location to determine the improvement $c_i$ in network performance parameters associated with building/installing each cell site i.

Mixed linear programming optimization engine 130 implements mixed linear programming optimization, using the determined resource requirement(s) $r_i$, the determined improvements $c_i$ in network performance parameters, and applying resource, and other, constraints, to optimize cell site placement and maximize improvements in network performance parameters (block 910). The decision variables of the mixed integer linear programming optimization may include decision variable $x_i$, where $x_i=1$ if cell site i is built, or $x_i=0$ is cell site i is not built. Decision variable $x_i$, therefore, has a binary restriction for possible values of the variable $x_i$. The objective function that engine 130 maximizes is the following:

$$\text{maximize} \Sigma_{i=1}^n c_i x_i \quad \text{Eqn. (1)}$$

where $c_i$ is the improvement in network performance parameters if cell site i is built; and $r_i$ is the one or more resources required if cell site i is built.

Engine 130, using mixed linear programming optimization, maximizes the objective function of Eqn. (1) subject to one or more constraints. In one implementation, the constraints include the following:

$$\sum_{i=1}^n r_i x_i \leq N \quad \text{Eqn. (2)}$$

$$L_m \leq \sum_{i=1}^n x_i \leq U_m \forall m \in M \quad \text{Eqn. (3)}$$

$$x_i + \sum_{k \in A_i} x_k \leq 1 \forall i \in I \quad \text{Eqn. (4)}$$

$$x_i \text{ is binary } \forall i \in I \quad \text{Eqn. (5)}$$

Eqn. (2) represents a global (e.g., national) resource constraint. Eqn. (3) represents upper ($U_m$) and lower ($L_m$) minimums and maximums that are selected based on a number of different factors, including, for example, the numbers of customers in a particular market (e.g., CMA), data traffic volume in that market, real estate availability for deployment of cell sites within the market, size of the market, and a long term potential projected for the market (including population, POIs, population growth, and household growth). Eqn. (4) represents a non-overlapping new cell site constraint that serves to prevent new cell site installations from overlapping.

Mixed linear programming optimization engine 130 generates a summary of optimized cell site placement recommendations, including projected improvements in network performance parameters (block 915). The summary of optimized cell site placement recommendations includes a list of cell sites i within the set I that, when built, will maximize the objective function of Eqn. (1) while simultaneously satisfying the constraints (e.g., of Eqn. (2), (3), (4), and (5)). The list of cell sites may additionally identify the geographic location of each cell site, and specify the particular improvements in network performance parameters. For example, the building/installation of cell site 3, in the example of FIG. 10, is projected to decrease the number of dropped calls in the geographic area by 20%, and decrease the frequency of low throughput connections by 30%.

Figure 11:
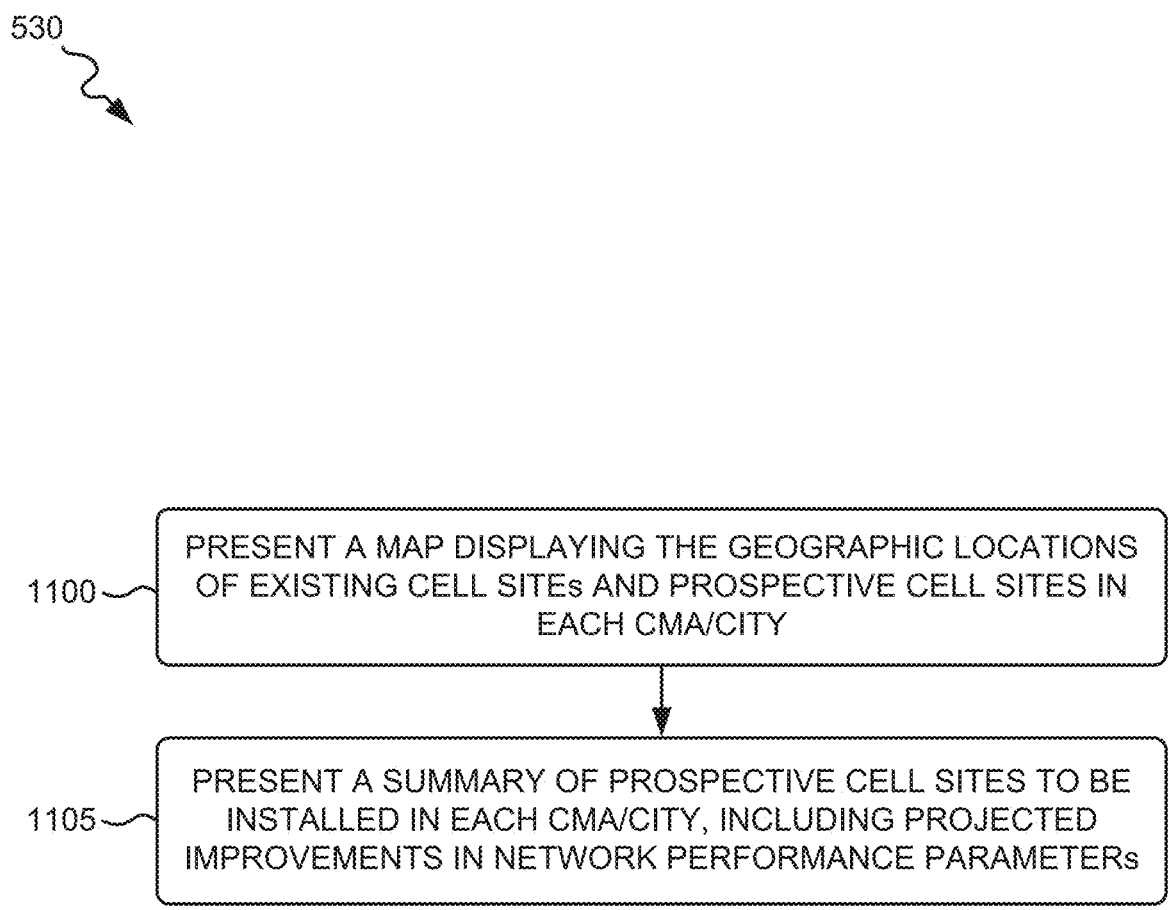
FIG. 11 is a flow diagram that illustrates one exemplary implementation of the process of FIG. 5.

FIG. 11 is a flow diagram that illustrates one exemplary implementation of block 530 of the exemplary process of FIG. 5. The exemplary process of FIG. 11 may be implemented by network coverage optimization system 205. The exemplary process of FIG. 11 may occur subsequent to the execution of the exemplary processes of FIGS. 6A and 6B, FIGS. 8A and 8B, and 9.

The exemplary process includes network coverage optimization system 205 presenting a map displaying the geographic locations of each existing cell site and prospective cell sites in each CMA and city (block 1100). Network coverage optimization system 205 may present the map to, for example, one or more of user devices 215 or cell site installer device 220. The map may depict a geographic region such as, for example, a CMA, city, or portion of a CMA or city, and may display existing cell sites at their existing geographic locations, and prospective cell sites at their candidate geographic locations. The map may contrast the existing cell sites with the prospective cell sites existing cell sites having a different color, or icon, then prospective cell sites). The geographic region covered by the map may be selected by a user viewing the map via, for example, user interface controls (e.g., zoom in; zoom out; pan east, west, north, or south).

Network coverage optimization system 205 presents a summary of prospective cell sites to be built in each CMA/city, including the projected improvements in network performance parameters (block 1105). The summary may additionally detail the population served, and the resources budgeted for building/installation of the new cell sites. Network coverage optimization system 205, in conjunction with the map presented in block 1100, may present a summary of prospective cell sites to be built in, for example, the geographic region displayed in the map. The summary may include the population served, in the particular displayed geographic region, by the prospective cell sites, the resources required to building/install the prospective cell sites shown in the displayed geographic region, and a projected quantification in improvements in network performance parameters for the building/installation of each prospective cell site shown in the displayed geographic region.

The foregoing description of implementations provides illustration and description, but is not intended to be exhaustive or to limit, the invention to the precise form disclosed.

Modifications and variations are possible in light of the above teachings or may be acquired from practice of the invention. For example, while series of blocks have been described with respect to FIGS. 5, 6A, 6B, 8A, 8B, 9, and 11, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

To the extent the aforementioned embodiments collect, store, or employ personal information of individuals, it should be understood that such information shall be collected, stored, and used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    identifying, by a network coverage optimization system, first areas of a plurality of areas of a wireless network for wireless site installation;
    performing machine learning, by the network coverage optimization system, to associate measured network performance parameters within the wireless network with empirical data related to at least one of population, residential buildings, or business buildings within the identified first areas of the wireless network;
    optimizing, by the network coverage optimization system based on the machine learning, geographic placement of prospective wireless sites within each of the identified first areas of the wireless network to maximize improvements in network performance parameters associated with installing the prospective wireless sites; and
    providing, by the network coverage optimization system, optimized wireless site placement recommendations for wireless site installation in each of the identified first areas.

2. The method of claim 1, wherein optimizing geographic placement of the prospective wireless sites further comprises:
    determining, based on the machine learning, geographic locations within each of the identified first areas for installing the prospective wireless sites.

3. The method of claim 2, wherein determining the geographic locations within each of the identified first areas comprises:
    obtaining a prospective wireless site list that describes the geographic locations, wherein the prospective wireless site list has been generated based on a survey of existing wireless network coverage provided by the wireless network,
    wherein optimizing the geographic placement of the prospective wireless sites is based on the prospective wireless site list.

4. The method of claim 2, wherein determining the geographic locations within each of the identified first areas comprises:
    obtaining information related to population, housing, and businesses in the plurality of areas;
    obtaining information related to existing wireless site coverage within each of the identified first areas; and
    identifying the geographic locations, and associated coverage areas, of the prospective wireless sites to fill in gaps in existing wireless site coverage within each of the identified first areas,
    wherein performing the machine learning is based on the information related to population, housing, and businesses, and the information related to existing wireless site coverage.

5. The method of claim 1, wherein optimizing the geographic placement of the prospective wireless sites further comprises:
    optimizing a number and type of the prospective wireless sites within each of the identified first areas of the wireless network.

6. The method of claim 1, wherein the empirical data related to at least one of population, residential buildings, or business buildings within the first areas comprises:
    at least one of population counts, population densities, housing growth rates, housing densities, or building growth rates within the first areas of the wireless network.

7. The method of claim 1, further comprising:
    forecasting, by the network coverage optimization system based on the machine learning, the improvements in network performance parameters associated with installing each of the prospective wireless sites.

8. The method of claim 1, wherein optimizing the geographic placement of the prospective wireless sites within each of the identified first areas of the wireless network further comprises:
    satisfying resource constraints when optimizing the geographic placement of the prospective wireless sites.

9. The method of claim 8, wherein optimizing the geographic placement of the prospective wireless sites further comprises:
using mixed linear programming to maximize the improvements in network performance parameters while also satisfying the resource constraints.

10. The method of claim 1, wherein performing machine learning further comprises:
creating, by the network coverage optimization system, a random forest regression model, or random forest classification model, to associate the measured network performance parameters with the empirical data.

11. The method of claim 1, wherein identifying the first areas of the plurality of areas of the wireless network comprises:
obtaining information related to population, housing, and businesses in the plurality of areas;
forecasting population growth in the plurality of areas based on the information related to population;
forecasting building construction growth based on the information related to housing and businesses; and
identifying the first areas based on the forecasted population growth and the building construction growth.

12. The method of claim 1, wherein the optimized wireless site placement recommendations include a geographic location, a type of each of the prospective wireless sites, and projected network performance parameter improvements associated with each cash wireless site placement.

13. A network coverage optimization system, comprising:
a communication interface; and
one or more processors configured to:
identify first areas of a plurality of areas of a wireless network for wireless site installation,
perform machine learning to associate measured network performance parameters within the wireless network with empirical data. related to at least one of population, residential buildings, or business buildings within the identified first areas of the wireless network,
optimize, based on the machine learning, geographic placement of prospective wireless sites within each of the identified first areas of the wireless network to maximize improvements in network performance parameters associated with installing the prospective wireless sites, and
provide optimized wireless site placement recommendations for wireless site installation in each of the identified first areas.

14. The network coverage optimization system of claim 13, wherein, when optimizing geographic placement of the prospective wireless sites, the one or more processors are further configured to:
determine, based on the machine learning, geographic locations within each of the identified first areas for installing the prospective wireless sites.

15. The network coverage optimization system of claim 14, wherein, when determining the geographic locations within each of the identified first areas, the one or more processors are further configured to:
obtain information related to population, housing, and businesses in the plurality of areas,
obtain information related to existing wireless site coverage within each of the identified first areas, and
identify the geographic locations, and associated coverage areas, of the prospective wireless sites to fill in gaps in existing wireless site coverage within each of the identified first areas,
wherein performing the machine learning is based on the information related to population, housing, and businesses, and the information related to existing wireless site coverage.

16. The network coverage optimization system of claim 13, wherein, when optimizing the geographic placement of the prospective wireless sites, the one or more processors are farther configured to:
optimize a number and type of the prospective wireless sites within each of the identified first areas of the wireless network.

17. The network coverage optimization system of claim 13, wherein the empirical data related to at least one of population, residential buildings, or business buildings within the first areas comprises:
at least one of population counts, population densities, housing growth rates, housing densities, or building growth rates within the first areas of the wireless network.

18. The network coverage optimization system of claim 13, wherein, when optimizing the geographic placement of the prospective wireless sites within each of the identified first areas of the wireless network, the one or more processors are further configured to:
satisfy resource constraints when optimizing the geographic placement of the prospective wireless sites.

19. The network coverage optimization system of claim 13, wherein, when identifying the first areas of the plurality of areas of the wireless network, the one or more processors are further configured to:
obtain information related to population, housing, and businesses in the plurality of areas,
forecast population growth in the plurality of areas based on the information related to population,
forecast building construction growth based on the information related to housing and businesses, and
identify the first areas based on the forecasted population growth and the building construction growth.

20. A non-transitory storage medium storing instructions executable by a network coverage optimization system, wherein the instructions comprise instructions to cause the system to:
identify first areas of a plurality of areas of a wireless network for wireless site installation;
perform machine learning to associate measured network performance parameters within the wireless network with empirical data related to at least one of population, residential buildings, or business buildings within the identified first areas of the wireless network;
optimize, based on the machine learning, geographic placement of prospective wireless sites within each of the identified first areas of the wireless network to maximize improvements in network performance parameters associated with installing the prospective wireless sites; and
provide optimized wireless site placement recommendations for wireless site installation in each of the identified first areas.

* * * * *